(12) United States Patent
Inoue et al.

(10) Patent No.: US 8,776,071 B2
(45) Date of Patent: Jul. 8, 2014

(54) MICROPROCESSOR OPERATION MONITORING SYSTEM

(75) Inventors: Atsushi Inoue, Tokyo (JP); Jun Takehara, Tokyo (JP); Hiroshi Nakatani, Tokyo (JP); Motohiko Okabe, Tokyo (JP); Yasutaka Umeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 380 days.

(21) Appl. No.: 13/273,438

(22) Filed: Oct. 14, 2011

(65) Prior Publication Data

US 2012/0096467 A1    Apr. 19, 2012

(30) Foreign Application Priority Data

Oct. 15, 2010  (JP) .............................. P2010-233097

(51) Int. Cl.
*G06F 9/46* (2006.01)
*G06F 11/30* (2006.01)

(52) U.S. Cl.
CPC ............ *G06F 11/30* (2013.01); *G06F 11/3024* (2013.01)
USPC ......................................... 718/102; 718/100

(58) Field of Classification Search
CPC .............................. G06F 11/30; G06F 11/3024
USPC ................................................... 718/100, 102
See application file for complete search history.

(56) References Cited

U.S. PATENT DOCUMENTS

| 6,658,602 | B1 * | 12/2003 | Nakano | ...................... 714/38.1 |
| 8,060,793 | B2 * | 11/2011 | Honda | ............................. 714/49 |
| 2010/0107246 | A1 * | 4/2010 | Ohta et al. | ...................... 726/22 |
| 2012/0110583 | A1 * | 5/2012 | Balko et al. | .................. 718/102 |
| 2012/0185858 | A1 * | 7/2012 | Ohnishi et al. | ............... 718/100 |
| 2013/0212436 | A1 * | 8/2013 | Zhu et al. | ........................ 714/35 |

FOREIGN PATENT DOCUMENTS

| JP | 2007-226527 A | 9/2007 |
| JP | 2008-310516 A | 12/2008 |

* cited by examiner

*Primary Examiner* — Emerson Puente
*Assistant Examiner* — Willy W Huaracha
(74) *Attorney, Agent, or Firm* — Holtz Holtz Goodman & Chick PC

(57) ABSTRACT

A microprocessor operation monitoring system whose own tasks are constituted by associating beforehand the task number of the task that is next to be started up, for each of the tasks constituting the program, and abnormality of microprocessor operation is detected by comparing and determining whether or not the announced task and the task to be started up match.

3 Claims, 7 Drawing Sheets

|  FILE ID  |  FIRST TASK INFORMATION  |  SECOND TASK INFORMATION  |
| --- | --- | --- | ss → sto2

| 002 | TASK A | 0 |
| --- | --- | --- |

(a)

sp → sto1

| 001 | TASK A | TASK B |
| --- | --- | --- |

(b)

ss → sto2

| 002 | TASK B | 0 |
| --- | --- | --- |

(c)

sp → sto1

| 001 | TASK B | TASK C |
| --- | --- | --- |

(d)

ss → sto2

| 002 | TASK C | 0 |
| --- | --- | --- |

(e)

sp → sto1

| 001 | TASK C | TASK A |
| --- | --- | --- |

| FILE ID | FIRST TASK INFORMATION | SECOND TASK INFORMATION | INFORMATION AS TO NUMBER OF TIMES OF LOOPING |
|---|---|---|---| sto1

| 001 | TASK B | TASK E | 1 |
|---|---|---|---|

(a)

sto2

| 002 | TASK E | 0 | 0 |
|---|---|---|---|

(b)

sto1

| 001 | TASK E | TASK F | 0 |
|---|---|---|---|

(c)

sto2

| 002 | TASK F | 0 | 0 |
|---|---|---|---|

(d)

sto1

| 001 | TASK F | TASK E | 1 |
|---|---|---|---|

(e)

sto2

| 002 | TASK E | 0 | 0 |
|---|---|---|---|

MICROPROCESSOR OPERATION MONITORING SYSTEM

CROSS-REFERENCE TO RELATED APPLICATION

This application claims benefit of priority from Japanese application number JP 2010-233097 filed Oct. 15, 2010, the entire contents of which are incorporated by reference herein.

FIELD

Embodiments of the present invention described herein relate generally to a microprocessor operation monitoring system that monitors the operating condition of a program executed by a microprocessor.

BACKGROUND

For fault detection of a microprocessor (microprocessing unit), typically, abnormality of the operation thereof is monitored using a watchdog timer.

Control devices are available that suitably reset a microprocessor when abnormality is generated during execution of normal operation of the microprocessor: apart from this action, such control devices may be provided with a watchdog timer that provides improved precision of resetting, so as to achieve appropriate resetting of the microprocessor even when abnormality is generated during execution of start-up processing. An example is disclosed in Laid-open Japanese Patent Application Tokkai 2007-226527 (hereinafter referred to as Patent Reference 1).

Microprocessor faults may be caused by program bugs, program falsification and software errors etc, and, in addition, may be caused by faults of the various constituent elements of the circuitry of the microprocessor.

In recent years, in safety devices such as control devices wherein a high level of safety is demanded, operation monitoring devices are being demanded that are capable of verifying normal operation of a device equipped with a microprocessor.

Accordingly, a microprocessor operation inspection system has been disclosed characterized in that it comprises: state changeover signal input means that receives input of a state changeover signal expressing transition of the state of the microprocessor in question, that is output from the microprocessor; state signal input means that receives input of a state signal expressing the current state of the microprocessor in question, that is output from the microprocessor; state storage means that stores the microprocessor state; state calculation means that calculates the new state that the microprocessor should adopt, from the microprocessor state stored in the state storage means and the state changeover signal; and inspection means that inspects the operation of the processor by comparing the new state that the microprocessor should adopt calculated by the state calculation means and the state of the microprocessor that was input through the state signal input means. This is disclosed in Japanese Patent Number 4359632 (hereinafter referred to as Patent Reference 2).

However, the microprocessor operation inspection system disclosed in Patent Reference 2 is subject to the problem that the construction of the operation detection circuitry is complicated, since it is necessary to incorporate in the operation inspection circuit a circuit that simulates beforehand the program that is being executed by the microprocessor, in the form of a state machine, and the new state that should be taken by the microprocessor must be calculated.

A further problem is that maintenance is complicated and troublesome, since it is necessary to alter the circuit that performs the simulation every time the program is altered.

Yet a further problem with this system is that, although it is possible to detect whether or not the start-up sequence of program tasks is normal, even if the sequence of loop start-ups is correct, the number of times of looping cannot be detected, so it is not possible to detect whether or not loop processing has been performed correctly for the preset number of times.

Also, there is the problem that when abnormality has occurred in the task start-up sequence, it is not possible to decide whether this represents abnormality of the microprocessor or abnormality of the operation inspection circuit.

According to an aspect of the present technology, a microprocessor operation monitoring system is provided whereby it is easy to define the new states that should be taken by the program that is being executed and whereby it is possible to decide not only the start-up sequence of program tasks but also whether or not loop processing has been correctly executed.

In order to achieve the above, a microprocessor monitoring system according to the present invention comprises: a microprocessor; and an operation monitoring device of abovementioned microprocessor, wherein:

abovementioned microprocessor comprises:

a computation section that executes a program;

a storage section that stores abovementioned program comprising a plurality of tasks; and a task information communication section that generates a transition announcement signal that announces beforehand to abovementioned operation monitoring device, in synchronization with the execution of abovementioned task of abovementioned program that is executed by abovementioned computation section, a first task number that is to be started up and a second task number that is next to be started up, and a start-up signal that announces the task that is to be started up next, following this transition announcement signal;

abovementioned tasks comprise:

a start-up instruction arranged at the head-end of its own task, that reports start-up of its own task; the processing program of abovementioned task in question; and a transition announcement instruction that reports the task that is next to be started up after abovementioned task in question, arranged at the tail-end of abovementioned task in question;

abovementioned task information communication section generates abovementioned start-up signal on receipt of abovementioned start-up instruction and generates abovementioned transition announcement signal on receipt of abovementioned transition announcement instruction; and abovementioned operation monitoring device decides whether the start-up sequence of abovementioned tasks of abovementioned program are consistent or inconsistent by comparing abovementioned second task number included in abovementioned transition announcement signal and abovementioned first task number included in abovementioned start-up signal; and, furthermore, if loop processing is present in abovementioned program, attaches to abovementioned transition announcement instruction the preset number of times of looping in respect of abovementioned second task that provides the commencement point of loop processing, and abovementioned task information communication section attaches abovementioned number of times of looping to a transition announcement signal corresponding to this transition announcement instruction, and abovementioned operation monitoring device stores abovementioned number of times of looping of abovementioned first task number attached to abovementioned transition announcement signal and totals abovementioned number of times of looping every time abovementioned first task number is detected in abovementioned start-up signal of subsequent start-ups, and determines matching of this total value with the stored abovementioned number of times of looping; and constitutes its own task by associating beforehand the task number of the task that is next to be started up, for each of the tasks constituting the program and performs a comparative determination of matching of the announced task with the task that is thus started up, and thereby detects abnormality of operation of the microprocessor.

With the present invention, a microprocessor operation monitoring system can be provided wherein creation of the new state that will be taken by the program that is being executed can easily be achieved and wherein not merely the start-up sequence of tasks of the program but also whether or not loop processing has been correctly processed can be ascertained.

BRIEF DESCRIPTION OF THE DRAWINGS

FIG. 6 is a diagram given in explanation of the start-up sequence identification action according to the present invention;

FIG. 7 is a diagram given in explanation of the number of times of looping identification action according to the present invention.

DETAILED DESCRIPTION

Figure 1:
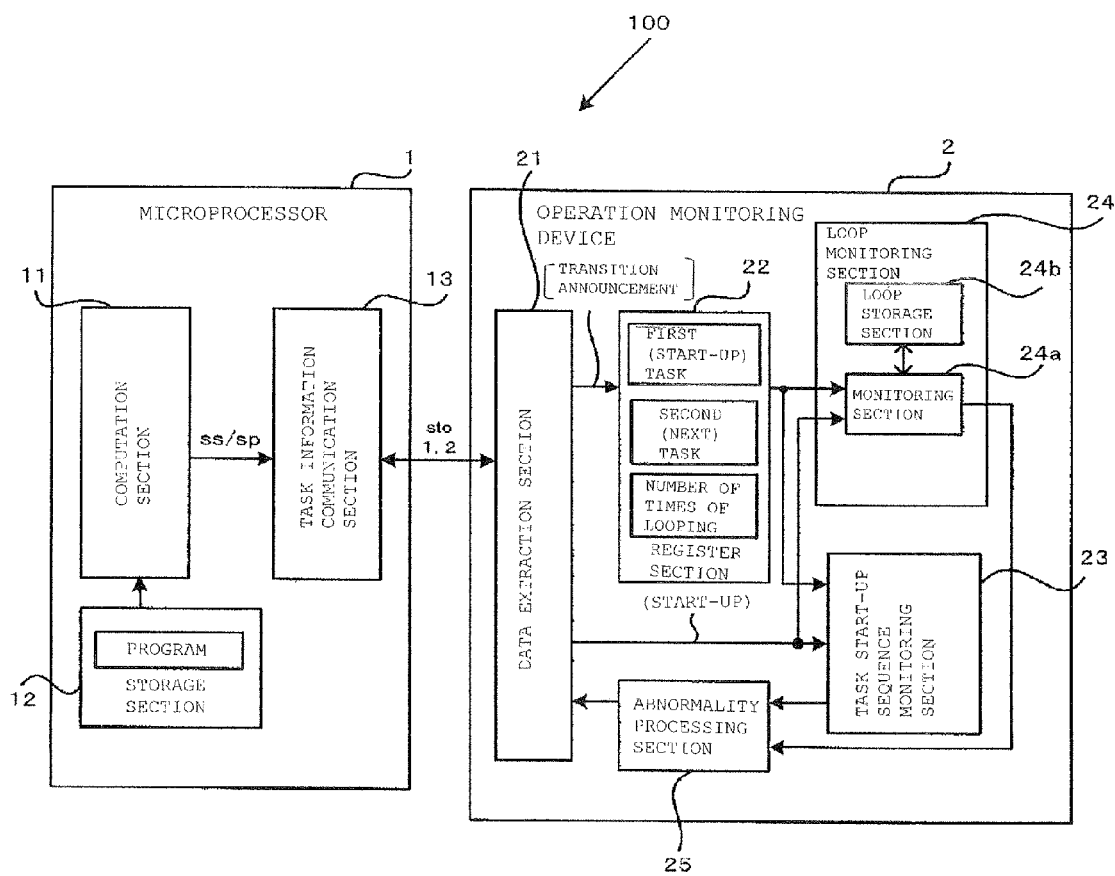
FIG. 1 is a construction diagram of a microprocessor operation monitoring system according to Embodiment 1 of the present invention.

The present embodiments are described in detail below with reference to the drawings.

Embodiment 1

Embodiment 1 is described below with reference to FIG. 1 to FIG. 7. First of all, the construction of this embodiment will be described with reference to FIG. 1. The microprocessor operation monitoring system 100 comprises a microprocessor 1 and an operation monitoring device 2 that monitors the operation of the microprocessor 11.

The microprocessor 1 comprises: a storage section 12 that stores a program comprising a plurality of tasks; a computation section 11 that extracts this program from the storage section 12 and runs the program; and a task information communication section 13 that generates a transition announcement signal that notifies the operation monitoring device 2 beforehand of the task number of a first task that is started up and the task number of a second task that is started up next, in synchronization with the execution of the program, and a start-up signal that announces the task that is started up following this transition announcement signal.

Figure 2:
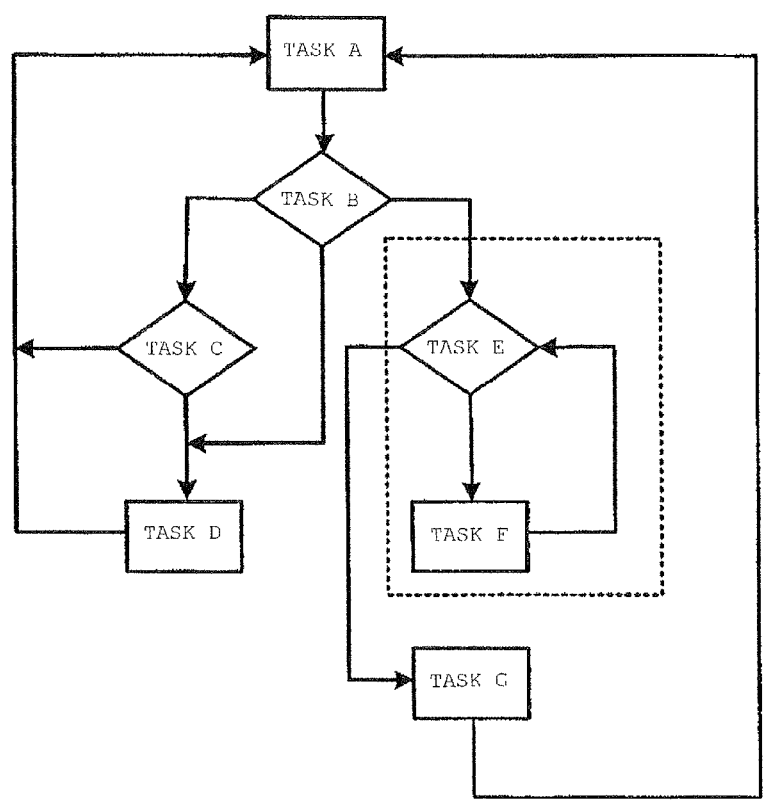
FIG. 2 is an example of a program comprising a plurality of tasks.

Next, the characteristic features of the construction of a program according to the present embodiment will be described with reference to FIG. 2 and FIG. 3. FIG. 2 is an example of a program given in explanation of this embodiment: processing of task units is shown in the form of a flowchart. Task A, task D, task G and task F indicate processing tasks; task B, task C and task E indicate branch tasks.

Figure 3:
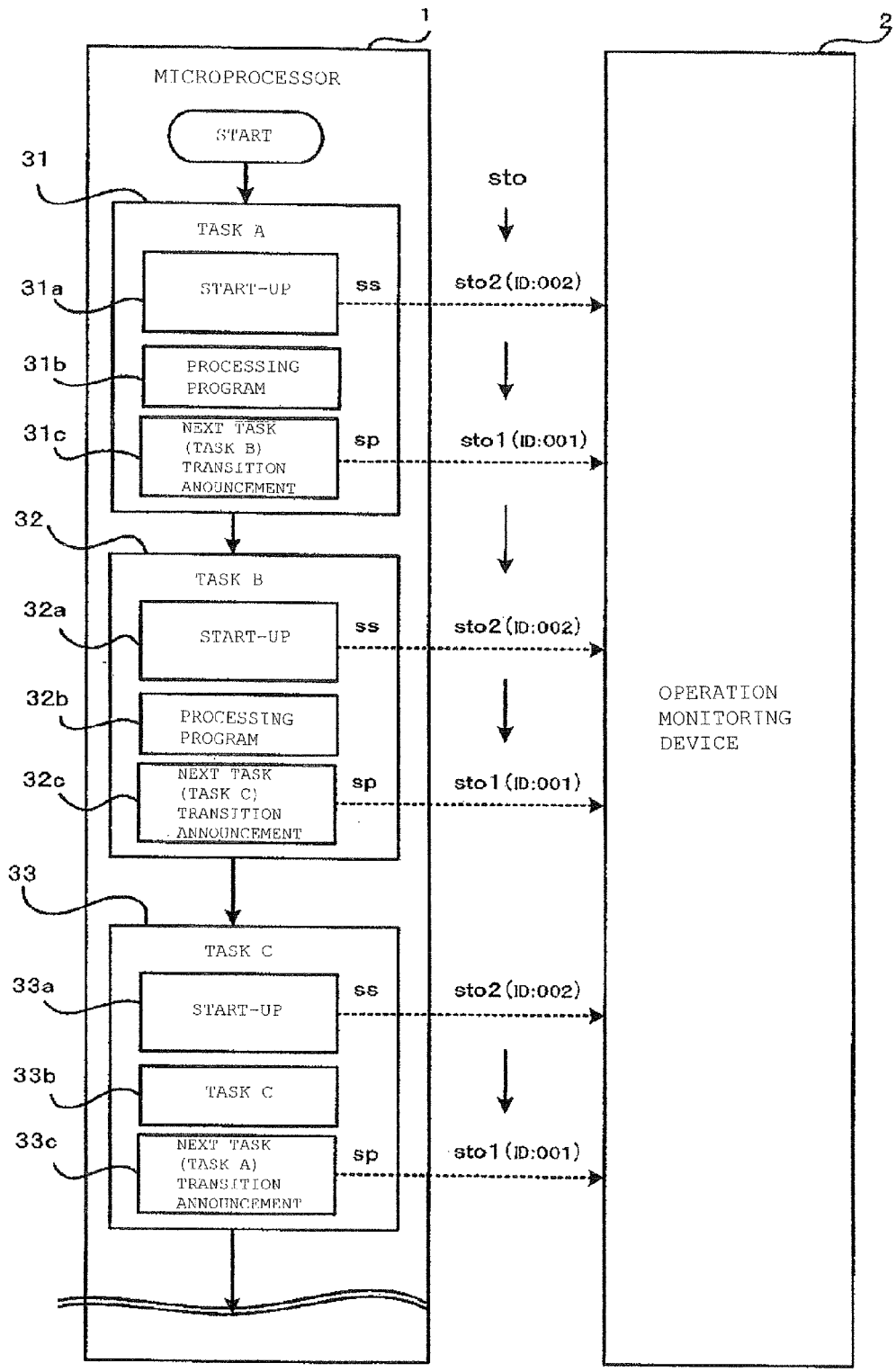
FIG. 3 is a diagram given in explanation of the constitution of tasks and task start-up, and transition announcement instructions according to the present invention.

FIG. 3 shows part of the structure of the respective tasks: for example, the task A that is initially started up comprises: a start-up instruction 31*a* that reports start-up of the task A and is arranged at the beginning of this task; a processing program 31*b* of this task A; and a transition announcement instruction 31*c* that reports the task that is started up next after task A, and that is arranged at the end of the task A.

Also, the task B that is next to be started up, reported by this transition announcement instruction 31*c*, likewise comprises: a start-up instruction 32*a* that reports start-up of the task B and is arranged at the beginning of this task; a processing program 32*b* of this task B; and a transition announcement instruction 32*c* that reports the task, for example task C, that is started up next after task B, that is arranged at the end of the task B, and that is selected by the processing result of the processing program 32*b*.

Hereinbelow, in the same way, the respective tasks are provided beforehand with a start-up instruction that is arranged at the beginning of its own task and that reports start-up of its own task; the processing program of its own task; and a transition announcement instruction that reports the task that is next to be started up after its own task, and that is arranged at the end of its own task.

When a program provided with tasks constructed in this way is executed by the computation section 11, start-up signals ss corresponding to the start-up instructions from the respective tasks, and transition announcement signals sp corresponding to the transition announcement instructions, are sequentially delivered to the respective task information communication sections 13.

Figure 4:
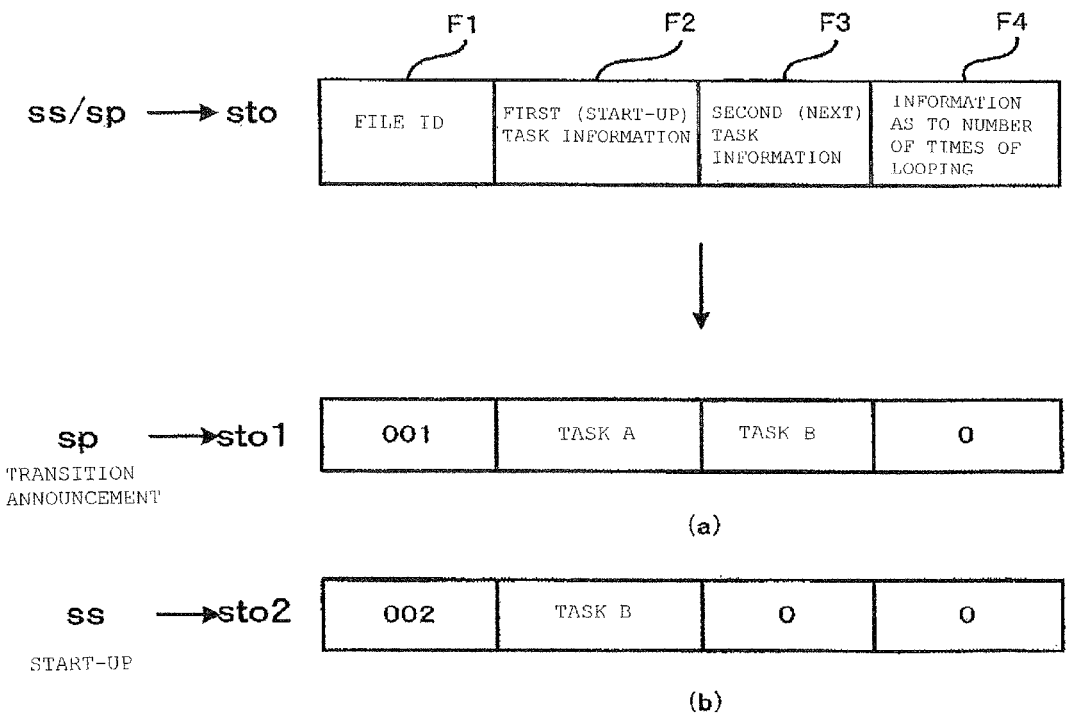
FIG. 4 is a diagram given in explanation of the tasks and operation monitoring device, and a transition announcement signal according to the present invention.

When these start-up signals ss and transition announcement signals sp are received by the task information communication sections 13, they are converted into packet signals (sto) of the data structure shown in FIG. 4 and transmitted to the operation monitoring device 2 by for example serial communication.

This packet structure comprises for example: a file ID F1 that identifies the start-up signal ss and transition announcement signal sp; information F2 of its own task (first task) that is started up; information F3 of the next task (second task) that is started up next after its own task; and looping number of times information F4, if loop processing is originated by the second task, as will be described in detail later.

As shown in FIG. 4(*a*), for example, the transition announcement packet signal sto 1 that is generated corresponding to the case where a transition announcement signal sp is received is: 001 (F1); task A (F2); task B (F3); and 0 (F4). As shown in FIG. 4(*b*), the start-up packet signal sto 2 corresponding to the case where a start-up signal ss is received is: 002 (F1); task A (F2); 0 (F3); and 0 (F4). A 0 entry indicates the case where no such task information is present.

Next, the operation monitoring device 2 that receives the first task information that is started up after these two packet signals sto 1 and 2 and the second task information of the transition that takes place next after this first task information, and monitors whether the task start-up sequence and the loop processing that are executed operate correctly, will be described.

As shown in FIG. 1 and FIG. 3, the operation monitoring device 2 comprises: a data extraction section 21 that receives the transition announcement packet signal sto 1 and extracts the data thereof; a register section 22 that temporarily stores task information extracted by the data extraction section 21; a task start-up sequence monitoring section 23 that compares first task information of the first task that is started up on receipt of a start-up packet signal sto 2 of the next task to be started up from the data extraction section 22 with the second task stored in the register section 22 and identifies abnormality of the start-up sequence of the task based on coincidence/non-coincidence of the task that is started up and the announcement of the task start-up sequence; a loop monitoring section 24 that monitors abnormality of the number of times of looping of the task that has been started up; and an abnormality processing section 25 that reports to the microprocessor 1, through the data extraction section 21, restarting or resetting of the program, when abnormality is detected by the task start-up sequence monitoring section 23 or loop monitoring section 24.

Figure 5:
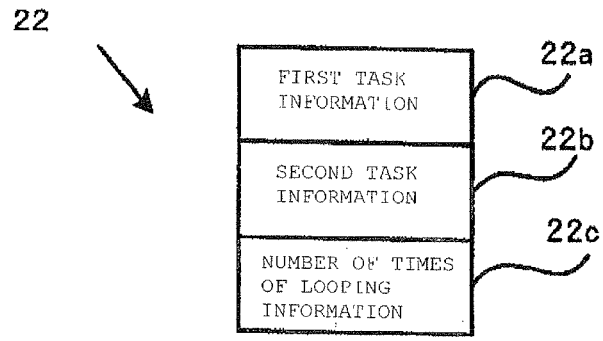
FIG. 5 is a diagram given in explanation of the constitution of a register section of the operation monitoring device.

As shown in FIG. 5, the register section 22 stores at least three items of task information. Respective registers thereof comprise: a register 22a that stores first task information; a register 22b that stores second task information; and a register 22c that, if the second task information is the starting point of loop processing, stores information as to the number of times of this loop processing.

Next, the operation of the task start-up sequence monitoring section 23 that monitors the task start-up sequence of this embodiment constructed in this way will be described, taking as an example the program of the flow chart shown in FIG. 2.

FIG. 6 shows an example of the history of a packet signal transmitted from the task information transmission section 13 to the operation monitoring device 2, based on the flow chart of FIG. 2.

First of all, the task A is started up and a start-up packet signal sto 2 as shown in FIG. 6(a) corresponding thereto is transmitted. Next, by executing the processing program of this step A, the task B that is to be executed next is identified, and the transition announcement packet signal sto 1 shown in FIG. 6(b) is transmitted, causing the transition to the task B that is next to be executed after the task A to be announced.

When the operation monitoring device 2 receives this transition announcement packet sto 1, "task A" is written in the register 22a of the register section 22 as the first task information and "task B" is written as the second task information.

Then, next, task B is started up, and the start-up packet signal sto 2 shown in FIG. 6(c) corresponding thereto is transmitted.

At this point, the task start-up sequence monitoring section 23 compares the second task information of the task A stored in the register section 22b with the first task information of the task B that was started up, decides whether these match or not, and transmits the decision result to the abnormality processing section 25.

Likewise, next, by executing the processing program task B, the task C that is next to be executed is identified, and a transition announcement packet signal sto 1 as shown in FIG. 6(d) is transmitted, so that the transition to the task C that is next to be executed after the task B is announced.

Subsequently in the same way, task processing is successively executed by execution of the program and the announced second task information and the information of the first task that was started up are compared and evaluated to decide whether the task start-up sequence is correct or not: the results of the decision are thereby returned in real-time to the microprocessor 1 through the data extraction section 21.

By means of this task start-up sequence evaluation method, the task information communication section 13 of the microprocessor 1 is able to generate a start-up signal on receiving the start-up instruction incorporated in each of the tasks beforehand, and, in addition, is easily able to generate a transition announcement signal by receiving the transmission announcement instruction. Thus, by comparing the second task number contained in the transition announcement signal with the first task number contained in the start-up signal, the operation monitoring device 2 is able to decide, by a straightforward construction, whether or not the start-up sequences of the program tasks coincide.

Next, the operation of the loop monitoring section 24 that identifies the number of times of looping by the loop processing circuit in the present embodiment constructed in this way will be described, taking as an example the loop circuit of the portion indicated by the broken lines in FIG. 2.

The loop monitoring section 24 includes a monitoring section 24a that determines whether the number of times of looping is normal or not and a loop storage section 22b that stores the second task information and this information as to the number of times of looping.

The data extraction section 21 then receives the transition announcement signal sto 1 shown in FIG. 7(a), and the task E and the information as to the number of times of looping is written in the register section 22c; thereupon, the loop monitoring section 24 extracts this second task information and the information as to the number of times of looping from the register section 22c, and writes these in the loop storage section 24b.

Next, on receipt of the start-up signal sto 2 shown in FIG. 7(b), the program of the task E is executed. Then, when, as a result of the processing of task E, the next task F to which a transition is to take place is identified, the transition announcement signal sto 1 shown in FIG. 7(c) is received.

Next, on receipt of the start-up signal sto 2 shown in FIG. 7(d), the program of task F is executed. Then, when, as a result of the processing of task F, the next task E to which a transition is to take place is identified, the transition announcement signal sto 1 shown in FIG. 7(e) is received.

Next, on receipt of the start-up signal sto 2 shown in FIG. 7(e), the monitoring section 24a compares this with the task information constituting the point of origin of the loop stored in the loop storage section 24b, and decrements the stored number of times of looping of the task E by 1. When, as a result, as shown in FIG. 7(f), the information as to the number of times of looping stored beforehand becomes 0, the information of the loop E that was written in the loop storage section 24b is deleted.

Also, if the number of times of looping is in an inconsistent condition so that a transition takes place to another task, such abnormality is identified and this result is returned to the microprocessor 1 through the data extraction section 21.

With such a loop monitoring section 24, if loop processing is present in the program, the preset number of times of looping in respect of the second task, constituting the point of origin of the loop processing, is used as the transition announcement instruction that is applied beforehand; the task information communication section 13 attaches this number of times of looping to the transition announcement signal corresponding to the transition announcement instruction; the operation monitoring section 2 accordingly stores the number of times of looping of the first task number that is supplied to the transition announcement signal, and totals the number of times of looping every time the first task number is detected in the start-up signals of subsequent start-ups, and identifies whether the aforementioned number of times of looping matches this stored total value or not.

As described above, with Embodiment 1, a microprocessor operation monitoring system can be provided whereby the task start-up sequence and loop processing can easily be independently monitored outside the microprocessor, without applying a load to the operation of the microprocessor, by arranging to attach a start-up instruction at the head-end of the task processing program comprised by the program and attaching a transition announcement instruction that announces the next task to which a transition is made as a result of the task processing, at the tail-end of the task processing program.

Embodiment 2

Next, a microprocessor operation monitoring system according to Embodiment 2 will be described with reference to FIG. 8. Portions in Embodiment 2 that are the same as corresponding portions of Embodiment 1 shown in FIG. 1 will be given the same reference symbols and further description thereof will be dispensed with.

Figure 8:
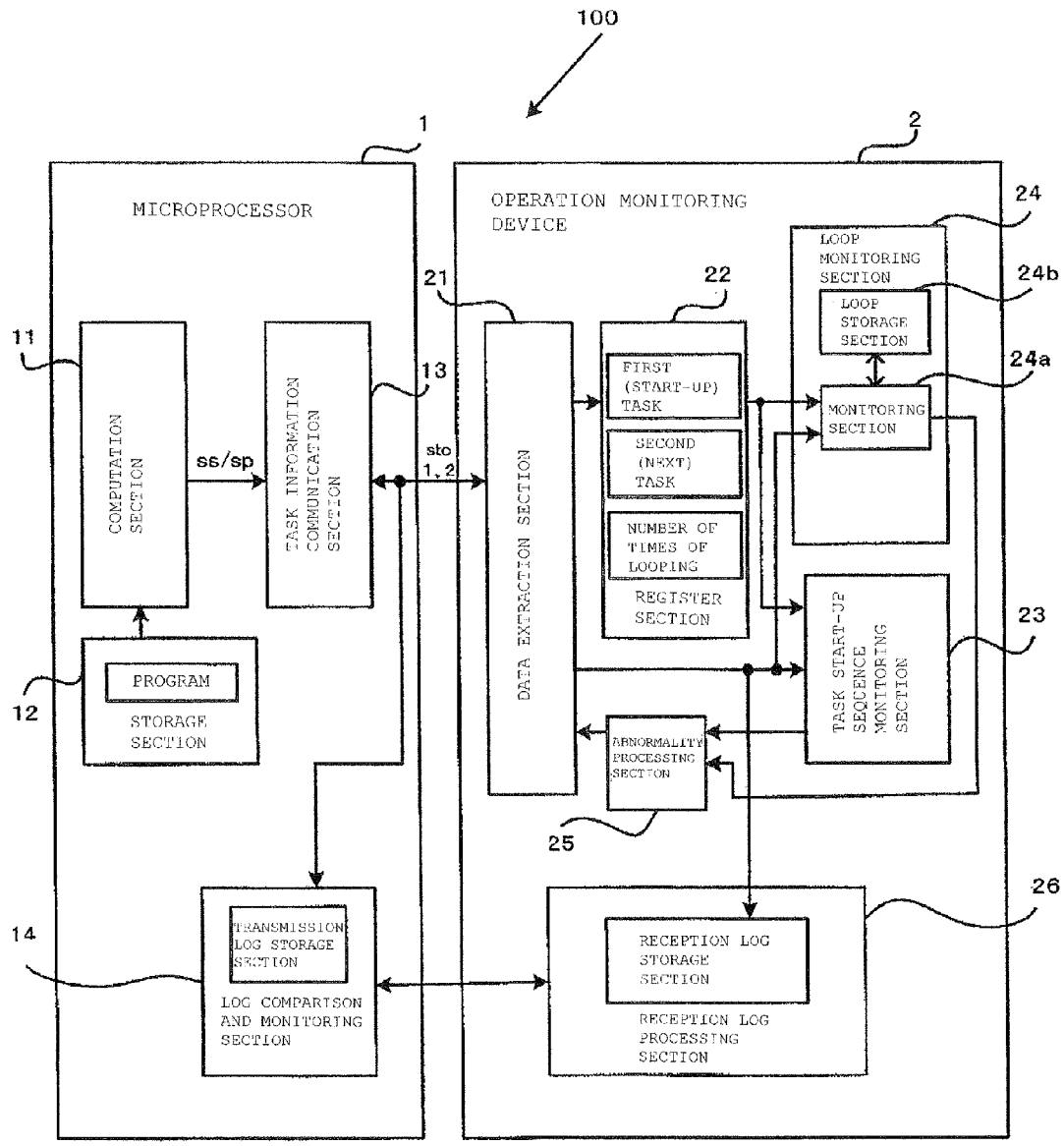
FIG. 8 is a construction diagram of a microprocessor operation monitoring system according to Embodiment 2 of the present invention.

As shown in FIG. 8, the difference of Embodiment 2 with respect to Embodiment 1 lies in that, with regard to the construction of Embodiment 1, in addition, information of the tasks that have been started up is respectively recorded by the microprocessor 1 and the operation monitoring device 2: the information of both logs is then compared, so that abnormality can be automatically identified from discrepancies.

Thus, with Embodiment 2, if it is found that the task start-up sequence or number of times of looping does not match, the microprocessor can confirm whether there is abnormality of the operation monitoring device.

While various embodiments of the present invention have been described, these embodiments are merely given by way of example and are not intended to restrict the scope of the invention. Such further embodiments could be implemented in various other modes, by omission, replacement or alteration in various respects, without departing from the gist of the present invention. Such embodiments or modifications are included in the gist of the present invention and are included in the scope of equivalents to the present invention as set out in the patent claims.

What is claimed is:

1. A microprocessor operation monitoring system comprising:
   a microprocessor; and
   an operation monitoring device that monitors operation of said microprocessor, wherein:
   (1) said microprocessor comprises:
      (i) a computation section that executes a program;
      (ii) a storage section that stores said program, wherein said program comprises a plurality of tasks, and wherein each of said plurality of tasks comprises:
         a) a start-up instruction, arranged at a head-end of said task, that reports start-up of said task;
         b) a processing program of said task that, when executed, identifies a task that is next to be started up; and
         c) a transition announcement instruction, arranged at a tail-end of said task, that reports said task that is next to be started up; and
      (iii) a task information communication section that:
         a) in response to receiving said transition announcement instruction, generates a transition announcement signal that announces to said operation monitoring device, in synchronization with an execution of a first task of said plurality of tasks of said program executed by said computation section, a first task number corresponding to said first task that is started up and a second task number corresponding to a second task that is next to be started up after said first task, wherein if loop processing is present in said program, said transition announcement instruction includes a preset number of times of looping with respect to said second task number to provide a commencement point of loop processing, and said task information communication section attaches said number of times of looping to said transition announcement signal corresponding to said transition announcement instruction; and
         b) in response to receiving said start-up instruction and following said transition announcement signal, generates a start-up signal that announces said second task that is next to be started up, the second task being announced by the start-up signal as a first task number of the start-up signal; and
   (2) said operation monitoring device:
      (i) determines whether a start-up sequence of said plurality of tasks is consistent by comparing said second task number included in said transition announcement signal and said first task number included in said start-up signal;
      (ii) stores said number of times of looping of said second task number attached to said transition announcement signal and totals said number of times of looping every time said first task number is detected in said start-up signal of subsequent start-ups, and determines matching of a total value with said stored number of times of looping; and
      (iii) associates a task number of said task that is next to be started up, for each of the plurality of tasks comprising said program, and performs a comparative determination of matching of an announced task with a task that is started up, and thereby detects abnormality of the operation of said microprocessor.

2. The microprocessor operation monitoring system according to claim 1, wherein said task information communication section and said operation monitoring device communicate by serial communication; and
   wherein said start-up signal and said transition announcement signal are transmitted by packets.

3. The microprocessor operation monitoring system according to claim 1, wherein said operation monitoring device comprises:
   a reception log storage section that stores a reception log of received start-up signals; and
   a reception log processing section that transmits said reception log to said microprocessor; and
   wherein said microprocessor comprises:
   a transmission log storage section that stores a log of transmitted start-up signals; and
   a log comparison and monitoring section that identifies an abnormality of an operation of said microprocessor operation monitoring system by comparing said reception log transmitted from said reception log processing section and said transmission log stored in said log storage section.

* * * * *